Sept. 7, 1937.  H. ALFARO  2,091,948
INTERNAL COMBUSTION ENGINE
Filed Feb. 9, 1934    3 Sheets-Sheet 1
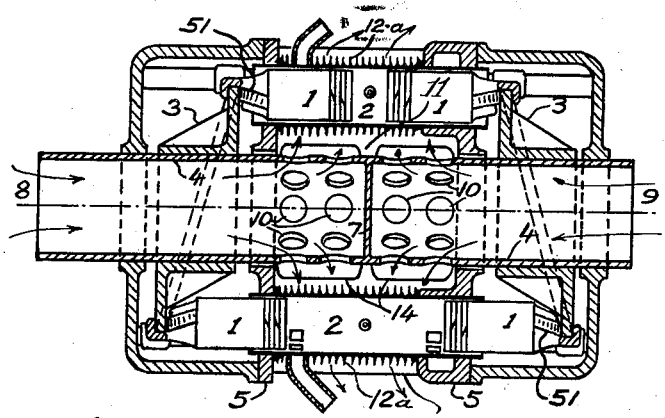
Fig. 1
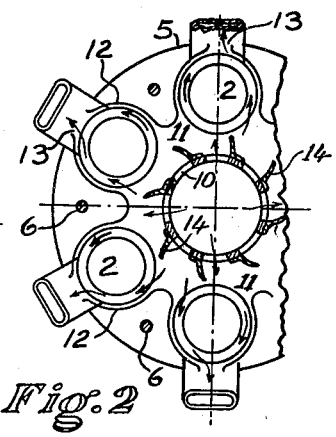
Fig. 2
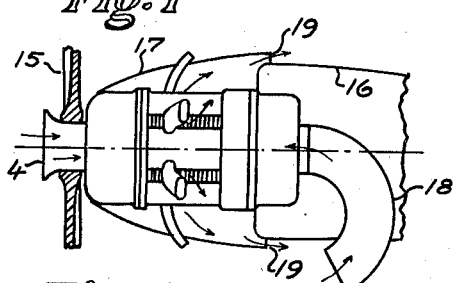
Fig. 3
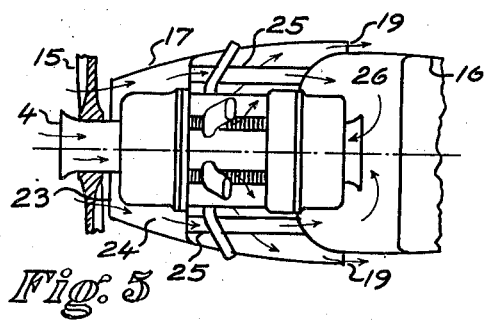
Fig. 5
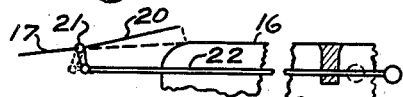
Fig. 4
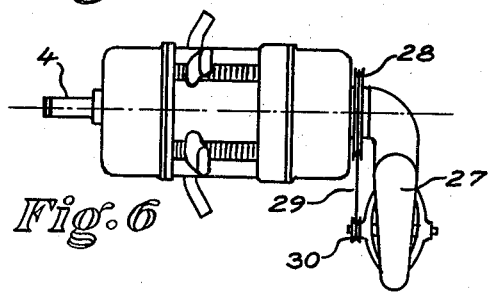
Fig. 6
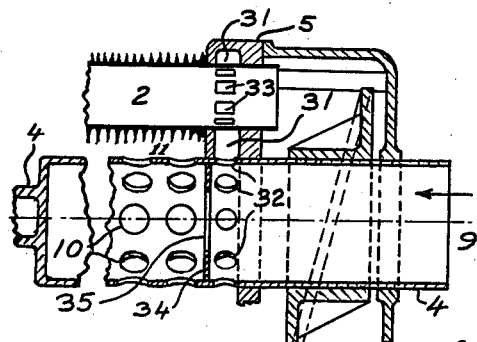
Fig. 7
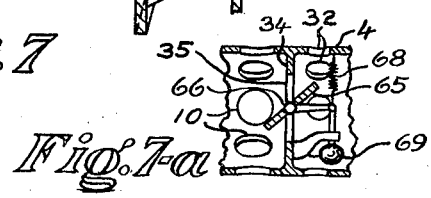
Fig. 7-a
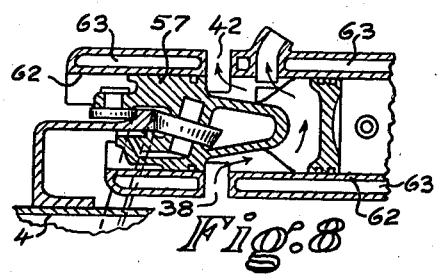
Fig. 8
INVENTOR
Heraclio Alfaro
BY Evans & McCoy
ATTORNEY

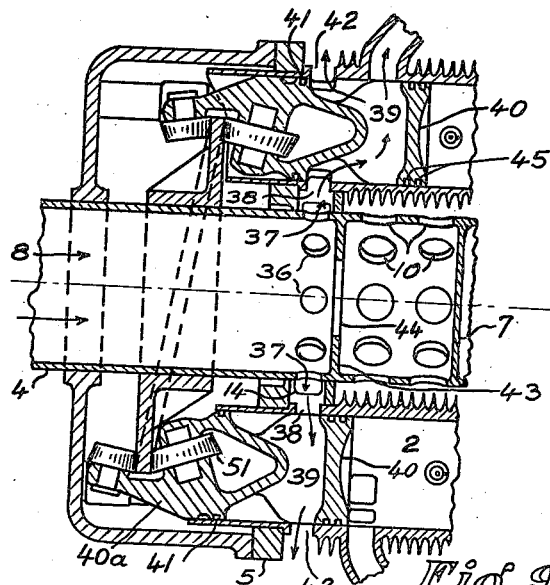
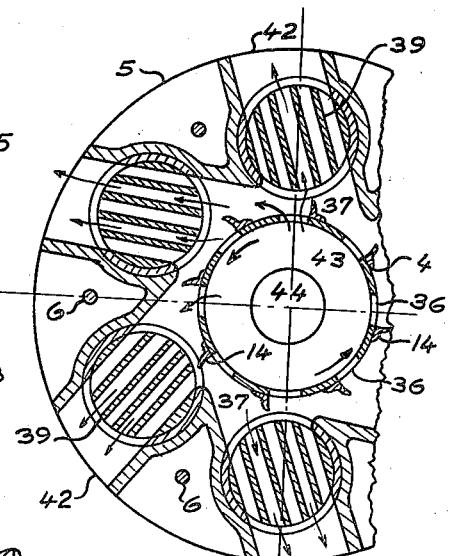
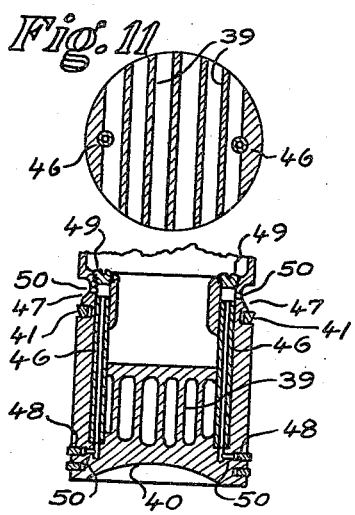
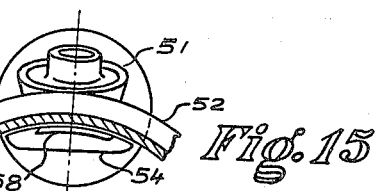
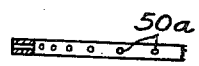
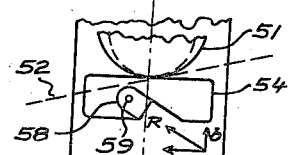

Patented Sept. 7, 1937

2,091,948

UNITED STATES PATENT OFFICE 2,091,948

INTERNAL COMBUSTION ENGINE

Heraclio Alfaro, Cambridge, Mass.

Application February 9, 1934, Serial No. 710,428

20 Claims. (Cl. 123—171)

This invention relates to barrel or wobble cam engines and more particularly to the construction and to means of cooling and lubricating such engines.

Cooling and lubrication are closely related essentials in internal combustion engines and the deficiency of the one imposes a greater demand of effectiveness upon the other.

My invention contemplates improvements in construction and means for properly cooling and lubricating engines of a type in which the cylinders are arranged in parallel or nearly parallel relation to the main shaft. To this class of engines belongs the engine I described in my patent application Serial No. 674,198, filed June 3, 1933.

An important object of this invention is to provide an engine of the character referred to, which is of simple and durable construction, and of very light weight.

Another object is to provide efficient means for cooling and lubricating such engines.

A further object is to provide a construction such that engines of this type, embodying the advantageous features above referred to, can be produced at a low manufacturing cost.

Further objects and advantages will be apparent from the following description and appended claims.

Referring to the accompanying drawings, forming a part of this specification:

Figure 1 is an axial section through a barrel engine showing the cylinder cooling means of the present invention;

Fig. 2 is a fragmentary transverse section through the engine shown in Fig. 1;

Fig. 3 is a sectional view showing the engine applied to an aircraft;

Fig. 4 is a detail view of a shutter for controlling the flow of air through the engine;

Fig. 5 is a view similar to Fig. 3 showing a different cowling;

Fig. 6 is a view showing the engine provided with a blower for circulating air through the engine;

Fig. 7 is a sectional view showing cylinder scavenging means associated with the cylinder cooling device;

Fig. 7a is a detail view showing a pressure regulating shutter which may be used in the device shown in Fig. 7;

Fig. 8 is a sectional view showing piston cooling means;

Fig. 9 is a fragmentary axial section through one end of a barrel engine having means for conducting air from the central main shaft over the cylinders and also through the individual pistons for cooling;

Fig. 10 is a transverse section through the engine shown in Fig. 9;

Fig. 11 is a transverse section through the piston showing the cooling fins;

Fig. 12 is a fragmentary axial section through the piston;

Fig. 13 is a detail view of a piston ring;

Fig. 14 is a fragmentary sectional view showing means for lubricating the cam engaging roller carried by a piston;

Fig. 15 is a sectional view showing a fragment of the cam and an end view of the piston looking toward the cam roller and oil scoop carried by the piston;

Fig. 16 is an elevation of the scoop looking toward the interior of the cylindrical cam body;

Figure 17:
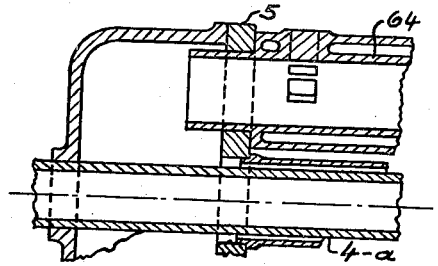
Fig. 17 shows the cylinder supporting structure applied to jacketed cylinders.

The invention is illustrated in the drawings as applied to an engine of the dual opposed piston two stroke cycle type, but various features of the invention are applicable to any engine having the cylinders arranged circumferentially about the shaft and parallel to it or at relatively small angles, 45° or less, relative to said shaft.

In this specification, the term "barrel engine" is to be understood to mean an engine with cylinders grouped about a main shaft and disposed parallel or nearly parallel, at angles of less than 45°, to said main shaft.

The term "composite cylinder block" is to be understood to describe a construction in which individual, separately formed cylinders are independently mounted in a supporting framework.

As shown in Fig. 1 of the drawings, the engine has pistons 1 operating in cylinders 2, wobble cams 3, and an axial, centrally disposed hollow shaft 4. The cams 3 are fixed to the shaft 4 and are engaged by suitable thrust members in the pistons to rotate the shaft upon reciprocation of the pistons, as is well understood in the art.

The cylinders are supported by spaced plates 5 in which the ends of the cylinders are mounted. The plates 5 have central openings to receive the shaft 4 and a series of openings around the central opening to receive the ends of the cylinders 2 which fit in the openings in the plates 5, and have external shoulders which bear against the inner faces of the plates. Any suitable means such as tie rods 6 may be provided for pressing the plates 5 against the shoulders of the cylinders to clamp the cylinders between the plates.

It will be observed by inspection of Figs. 1, 2, 7, 8, 9, 17, and 18 that the various illustrated modifications of my invention embody a "composite type of cylinder block" construction in which each cylinder is a separate replaceable unit, said cylinders being held in place between the plates 5 and secured by the tie rods 6 or other suitable means.

It will be apparent that the composite cylinder block construction above described may be applied to engines which are liquid cooled, in which case the fins of the cylinders 2 can be replaced by a cooling jacket to circulate the cooling fluid. This is shown in Fig. 17 where a jacketed cylinder 64 is shown supported by plates 5. In this case the shaft 4a may be of a smaller diameter than in engines where the cooling air is circulated through the shaft.

If the shaft 4 is open at both ends, as shown in Fig. 1, a partition 7 is preferably provided intermediate the ends thereof. Air may be caused to flow into both the front end 8 and the rear end 9 of the shaft simultaneously. In some cases it may be desired to permit air to enter from one end of the shaft only, in which case the passage through the shaft will be closed adjacent the end opposite the open end. Such a structure is shown in Fig. 7. In other cases the partition is necessary to enable the use of different air pressures in the two ends of the shaft to provide a greater volume of air to flow over the exhaust end of the engine than flows over the relatively cooler intake end or in the case of air from one end of the shaft being used for scavenging or piston cooling, as well as cylinder cooling, to provide a greater volume of air from that end of the shaft.

In the structure shown in Figs. 1 and 2, the air passes from inside the shaft through holes 10 into a space 11 around the shaft, and is thereafter directed by baffle plates 12 around the cylinders between cooling fins 12a on the cylinders, and escapes through gaps 13 between baffle plates 12.

The air may be impelled in the above described path by blades 14 such as shown in Figs. 1 and 2, which are attached to the shaft 4 and spaced apart around the shaft to form a centrifugal fan. The fan blades 14, upon rotation of the shaft 4, draw the air by suction through the holes 10 and throw the air out against the cylinders and baffles 12, maintaining a constant flow of air over the fins 12a. The volume of air required for cooling varies in different engines. For some kinds of engines blades such as the blades 14 will be sufficient. For other engines means for forcing air into the shaft under pressure may be employed as shown in Figs. 3, 5, 6, and 20.

Figure 18:
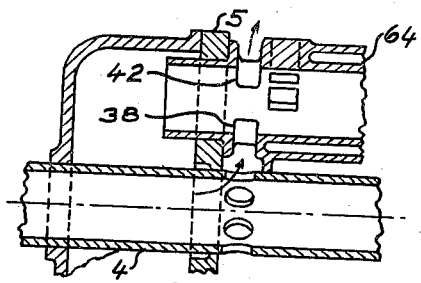
Fig. 18 shows a structure similar to that shown in Fig. 17 in which means is provided for circulating air from the main shaft through the pistons of the cylinders.

When desired, the pistons can be cooled with air admitted through the central shaft, in which case ports for the circulating air through the pistons are provided. An arrangement for cooling the pistons of jacketed cylinders is shown in Fig. 18 where the cooling air enters shaft 4 and passes through a port 38 into the piston and out through a port 42 as indicated by the arrows.

Fig. 3 shows an air cooled engine such as illustrated in Figs. 1 and 2, applied to an aircraft. A portion of the aircraft propeller is shown mounted on the shaft 4 and is indicated by the reference numeral 15. The fuselage or "nacelle" of the aircraft proper is indicated by the reference numeral 16, and the cowling enclosing the engine is indicated by the reference numeral 17. The forward velocity of the machine causes the air to flow into the forward end of shaft 4 and creates pressure within the shaft to force the air out through the openings 10 against the cylinders. If it is desired to force air under pressure into both ends of the shaft 4, a scoop 18 may be provided which catches the air and forces it into the rear end of the shaft 4. The cowling 17 is provided with air outlets 19 and should preferably be formed so as to create as great a suction as possible at the air outlets 19.

If desired, the flow of air over the engine cylinders may be controlled to regulate the engine temperature. One way of accomplishing this result is shown in Fig. 4 where a shutter 20, which swings about a pivot 21, can be moved about its axis by means of a rod 22 to completely close the outlets or to restrict them as desired.

Another form of cowling for aircraft engines is shown in Fig. 5 where part of the air enters from the forward end of the shaft as in the construction shown in Fig. 3 and part enters through an annular opening 23 into a chamber 24 around the forward end of the engine and then passes through passages 25 into a chamber 26 at the rear end of the engine from which it passes into the rear end of shaft 4 as indicated by the arrows.

Figure 20:
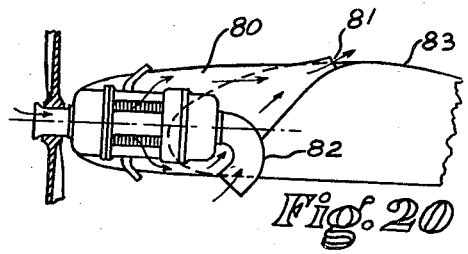
Fig. 20 shows the engine of the present invention applied to an aeroplane in the wing thereof, together with means for maintaining a current of air through the engine during flight.

When an aircraft engine of this type is mounted in the wing of an airplane, a form of cowling as shown in Fig. 20 is desirable. It is known that the suction or drop of pressure in the upper part of the wing is considerably greater at high angles of attack than at low angles of attack. Flight at high angles of attack usually occurs when climbing. In a climbing attitude the airplane usually flies slower and demands the maximum power of the engine. It is, therefore, highly desirable to provide efficient means of cooling the engine when flying at a high angle of attack and at low velocity.

Effective cooling under such conditions can be obtained by locating the outlet of the cooling air in a region of low air pressure above the wing as shown in Fig. 20. The air enters through either one or both ends of the shaft 4 of the engine and, after going through the engine in any of the ways previously described, passes to a chamber 80 which communicates with the outside atmosphere through an outlet slot 81 located at a point in the wing 83, which is in the neighborhood of the point of lowest pressure in the wing when the machine is in a climbing attitude. It may be also desirable to connect the rear end shaft inlet 82 at a point of high pressure in the lower face of the wing as shown in Fig. 20. The opening 81 should preferably extend spanwards in the form of an elongated slot.

Figure 21:
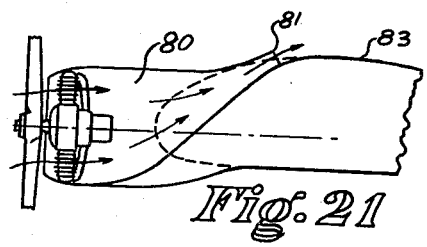
Fig. 21 is a view similar to Fig. 20 showing the same air circulating means with a conventional engine of the radial cylinder type.

Fig. 21 shows a conventional radial type air-cooled aircraft engine mounted on a wing and using the method of cooling just described. The air enters from the front and follows the arrows to leave through the chamber 80 and outlet slot 81.

The air suction at point 81 will intensify the circulation of air and the cooling. If desired a shutter such as shown in Fig. 4 can be placed at opening 81 to regulate the cooling of the engine.

The cooling air, if desired, can be forced into the shaft 4 by positive mechanical means as illustrated in Fig. 6. In this figure a centrifugal blower 27 is shown, although any other type of air blower or compressor may be used. When an exterior blower is used it is preferable to have the shaft 4 closed at its forward end, as shown in Fig. 7 instead of intermediate its ends. The blower 27 may be driven by any suitable means and may be actuated directly by the engine itself by means of pulley 28, belt 29 and pulley 30, as shown in Fig. 6.

In some cases it may be desirable to use a single air compressor to circulate the cooling air and at the same time to scavenge the residual gases from the cylinders. The scavenging may be effected by connecting the intake chamber 31 with the inner part of shaft 4, as shown in Fig. 7. The air under pressure in the shaft 4 passes through holes 32 into the intake chamber 31 whence it is transfererd into cylinder 2 through ports 33 when permitted by the motion of the piston. The cooling air passes also through holes 10 into chamber 11 and is forced through the fins of the cylinders, it being understood that baffles similar to the baffles 12 shown in Fig. 2 are preferably used.

If it is desired to provide a higher pressure to scavenge the residual gases than to cool the engine, a restriction may be placed in shaft 4 between the holes 10 and holes 32. Such a restriction is shown in Fig. 7 in the form of a diaphragm 34 with a central hole 35. It is apparent that this hole may be made of a size to obtain the desired difference of pressure between the air supplied to the holes 32 for scavenging and to the holes 10 for cooling.

To facilitate starting and scavenging at very low operating velocities, a shutter can be installed in the hole 35. This is shown in Fig. 7a where a shutter 65 is pivoted at 66 and is acted upon by a counterweight 69 and a spring 68. When the engine is still, and when the shaft revolves slowly, as it does while the engine is starting, the shutter 65 is held closed by the tension of the spring 68. But as the rotational speed increases, the counterweight 69 moves outwardly due to centrifugal force, overcomes the tension of the spring 68, and gradually opens the shutter, permitting air to pass to the cylinder cooling chamber.

In order to improve the operation of the pistons, a cooling stream of air may be also directed from the inside of the shaft 4 through the pistons, as is shown Figs. 9 and 10, where the cooling air is allowed to pass from the shaft 4 through the holes 36 into a chamber 37 surrounding the shaft. The cylinders 2 are provided with ports 38 to the chamber 37 through which the cooling air flows constantly regardless of the position of the piston in the cylinder. The air, when passing through the piston, strikes cooling fins 39 which are integrally bound to the piston head 40 and slipper 40a which carries a roller 51 engaging the cam 3. This arrangement serves to prevent over-heating of the piston head and thereby tends to avoid detonation of fuel and the burning of the oil film about the piston rings which causes sticky piston rings.

It will be understood that the half of the engine shown in Fig. 9 is substantially identical with the half not shown and that the cylinders are cooled in the same way as described in connection with Figs. 1 and 2, the air being conducted over the cylinder surfaces and between the fins through restricted passages formed between the baffle plates 12 and cylinders. Fig. 9 shows also an oil scraper ring 41 which is located in the piston for the purpose of scraping out any excess oil from the cylinder walls in order to avoid wastage through the air cooling outlet ports 42.

If it is desired to provide a greater circulation of the cooling air through the pistons than through the outside fins of cylinder 2, a restriction plate 43 with a hole 44 of the proper size can be provided in the shaft between the holes 36 and the holes 10. Since the air flows from end 8 of shaft 4 it can be seen that a greater supply of air will circulate through the holes 36 than through the holes 10. To increase the air circulation through the pistons, blower vanes 14 may be placed adjacent holes 36.

In order to provide efficient lubrication of the rings 45 of the piston head without undue oil wastage through the various cylinder ports, oil ducts 46, such as shown in Figs. 11 and 12, may be provided. The oil scraped by ring 41 is collected in a circumferential groove 47 formed in the exterior face of the piston and this oil will pass through the ducts 46 into the groove 48 of one of the rings of the piston head 40. Obviously, the lubrication duct 46 may be connected to any one or all of the piston ring grooves as desired. The ducts 46 are preferably in the form of tubes inserted into bores in the body of the piston which are closed at their outer ends by plugs 49. Suitable holes 50 may be drilled from the grooves 47 and 48 to the longitudinal ducts 46 to complete the oil circuit, as shown in Fig. 12.

The air cooled piston may be used in connection with a liquid cooled jacketed cylinder if desired, as shown in Fig. 8, where the air cooled piston 57 operates in a jacketed cylinder 62. In this instance the jacket 63 contains the cooling liquid; and ports 38 and 42, arranged as previously described, allow circulation of the cooling air through the piston.

Due to the unusual design of this engine, and due also to the means employed for transformation of the linear movements of the pistons into the rotative motion of the shaft, a special lubrication system, adapted to the peculiar requirements of the engine, is necessary for efficient and economical operation.

One of the lubrication problems presented is the lubrication of the roller 51 which is journaled in the piston and rolls on a wobbler cam 52 attached to the shaft 4. Fig. 14 shows a means for lubricating the roller 51. As shown in Fig. 14, the cam 52 is of the drum type having a body of cylindrical form which has an interior cylindrical (or nearly cylindrical) surface 53 with which scooping element 54, carried by the piston, coacts. Lubricant is held against the surface 53 of the rotating cam by centrifugal force and is carried on the rotating surface in the form of a thick film of oil. The scoop 54 impedes the movement of said oil film with the rotating surface, and, therefore, imparts a pressure to the oil corresponding to its drop of velocity plus its viscous resistance. This pressure is used to force the oil to the parts to be lubricated.

In Fig. 14 a pipe 55 is shown which pours oil over the inner face 53 of the cylindrical cam body 52, which oil forms a film or layer 56 against the inner surface 53 of the drum cam.

Fig. 15 shows a front view of the scoop 54 engaging the interior of the drum cam 52. The scoop 54 serves the double purpose of collecting oil from the cam 52 and of holding the piston assembly 57 from rotational movements about its longitudinal axis.

Fig. 16 shows a top view of the scoop 54. The oil carried by the inner face 53 of the drum cam travels around with the cam and, at the same time, flows lengthwise of the cam 52 due to its radial pressure. The arrows "a", "b", and "R" in Fig. 16 provide a sectorial showing of the component velocities and resultant flow of the oil, the rotational speed being indicated by the arrow "a" in Fig. 16. The lengthwise displacement of the oil being indicated by the arrow "b" and the resultant motion of the oil being indicated by the arrow "R". A groove 58 cut in the scoop 54 faces the resultant path of motion of the oil film and interferes with its progress, which results in building up the necessary pressure for lubrication. From the groove 58 the oil passes through passages 59 in the piston body to an axial passage in the axle 60 of the roller 51, the axle 60 being stationary and having a radial oil hole 61 through which the oil passes to the bearing surface of the roller 51.

The oil scoop 54 can equally well be used to pour oil onto an interior face of the piston for cooling purposes. For this purpose the dimensions of the various parts may be enlarged.

Figure 19:
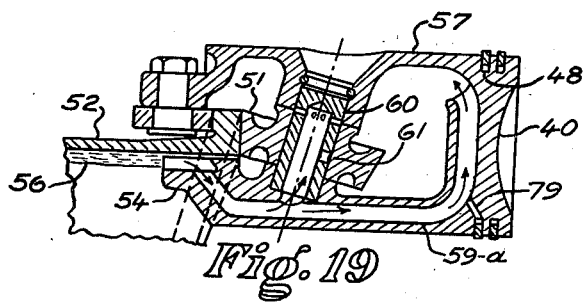
Fig. 19 is a sectional view showing a combined piston lubricating and cooling means.

Fig. 19 shows an oil cooled piston in which the scoop 54 is larger and the duct 59 is extended past the axle 60 into a channel 59a which carries the oil to the crank case side of the piston head for cooling purposes. If lubrication of the exterior of the piston and piston rings is desired, holes such as the hole 79 may be provided to supply oil to the bottoms of one or more of the ring grooves 48 and the piston ring in this groove may be provided with suitable passages such as holes 50a to transfer oil to the cylinder wall, as shown in Fig. 13.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. In a barrel engine, a hollow main shaft which is open at both ends and which has a partition intermediate its ends, the wall of said shaft having outlets at opposite sides of said partition.

2. In a barrel engine, a hollow main shaft having spaced air inlets, a transverse partition across the interior of the shaft intermediate the inlets, a second partition between the first partition and one of the inlets, said last partition having a hole, and lateral outlets in the wall of the shaft on opposite sides of each of said partitions.

3. In a barrel engine, a hollow main shaft having a closure and an air inlet spaced apart, a perforated partition intermediate the inlet and closure, and lateral outlets on opposite sides of the perforated partition.

4. In a barrel engine, a hollow main shaft having a closure and an air inlet spaced apart, a partition in the shaft between the closure and inlet, said partition having a hole and a shutter in said hole to regulate the passage of air, and lateral outlets in the shaft wall on opposite sides of the partition.

5. In a barrel engine, a hollow main shaft having a closure and an air inlet spaced apart, a partition in the shaft between the closure and inlet, said partition having a hole and a shutter in said hole to regulate the passage of air, lateral outlets in the shaft wall on opposite sides of the partition, and means for operating the shutter controlled by the rotation of the shaft.

6. In a barrel engine, a hollow main shaft having an air inlet and longitudinally spaced lateral outlets, means for creating a flow of air through the shaft from the inlets to the outlets, and means within the shaft for differentially varying the pressure at said outlets.

7. A barrel engine comprising circumferentially arranged cylinders, a hollow main shaft disposed centrally of said cylinders, said shaft having an air inlet and lateral outlets, certain of said outlets communicating with the interiors of the cylinders and others spaced longitudinally with respect to the first mentioned outlets and arranged to direct air currents against the exterior surfaces of the cylinders, means for creating a flow of air from the inlet through the shaft and outlets, and means for differentially varying the pressure at said outlets.

8. A barrel engine comprising circumferentially arranged cylinders, a hollow main shaft disposed centrally of said cylinders, said shaft having an air inlet and lateral outlets, certain of said outlets communicating with the interiors of the cylinders and others spaced longitudinally with respect to the first mentioned outlets and arranged to direct air currents against the exterior surfaces of the cylinder, means for creating a flow of air from the inlet through the shaft and outlets, adjustable means intermediate the outlets to the interior and exterior of the cylinders for restricting the interior passage of the shaft, and means controlled by the rotation of the shaft for actuating said adjustable means.

9. A barrel engine for aircraft having cylinders grouped about a hollow main shaft, said shaft having a partition intermediate the ends of the cylinders and lateral outlets at opposite sides of said partition, said shaft being open at its forward end so that air will enter at said end, means for directing a stream of air into the rear end of said shaft, and means for directing streams of air radially from said shaft over the surfaces of the cylinders.

10. A barrel engine for aircraft having cylinders grouped about a hollow main shaft, said shaft having a partition intermediate the ends of the cylinders and lateral outlets at opposite sides of said partition, said shaft being open at its forward end for entry of air, a duct having a forwardly directed opening and connected to the rear end of said shaft to deliver air into said rear end, and means for directing streams of air laterally from said shaft against the exterior surfaces of said cylinders.

11. In a barrel engine, a hollow rotatable main shaft having longitudinally spaced outlets, cylinders grouped around said shaft, means for causing air to flow into said shaft, means for conducting air from within the shaft through certain of said outlets to the interiors of the cylinders, and means for conducting air from the interior of the shaft through other of said outlets over exterior surfaces of the cylinders.

12. In a barrel engine, a hollow rotatable main shaft having longitudinally spaced outlets, cylinders grouped around said shaft and having exterior cooling fins, means for causing air to flow into said shaft, means for conducing air from within the shaft through certain of said outlets to the interiors of the cylinders, and means for conducting air from the interior of the shaft through other of said outlets over exterior surfaces of the cylinders including deflecting plates to direct the air streams between the fins of said cylinders.

13. In a barrel engine, a hollow rotatable main shaft having a closure and an air inlet spaced apart and a lateral outlet intermediate the inlet and closure, cylinders grouped around said shaft, pistons in said cylinders provided with air passages, means for forcing air into the shaft, and means interposed between the shaft and cylinders for conducting air outwardly from the shaft outlet and through the passages of said pistons.

14. In a barrel engine, a hollow rotatable main shaft, a plurality of cylinders arranged parallel to said main shaft, each cylinder having ports, two pistons in each cylinder, a chamber surrounding the shaft and communicating with ports in the cylinders, outlets in the wall of the shaft for delivering air into said chamber, air passages in the pistons communicating with the ports of the cylinders, said ports in the cylinders and passages in the pistons being in constant communication for continuous flow of air from the main shaft through the pistons.

15. In a barrel engine, a hollow rotatable main shaft, a plurality of cylinders arranged parallel to said main shaft, each cylinder having ports, two pistons in each cylinder, a chamber surrounding the shaft and communicating with ports in the cylinders, outlets in the wall of the shaft for delivering air into said chamber, air passages in the pistons communicating with the ports of the cylinders, said ports in the cylinders and passages in the pistons being in constant communication for continuous flow of air from the main shaft through the pistons, and outlets in the wall of said shaft for delivering air from the interior of said shaft into the space between the shaft and the cylinders.

16. In a barrel engine, a hollow rotatable main shaft, a plurality of cylinders arranged parallel to said main shaft, each cylinder having ports, two pistons in each cylinder, a chamber surrounding the shaft and communicating with ports in the cylinders, outlets in the wall of the shaft for delivering air into said chamber, air passages in the pistons communicating with the ports of the cylinders, said ports in the cylinders and passages in the pistons being in constant communication for continuous flow of air from the main shaft through the pistons, outlets in the wall of said shaft for delivering air from the interior of said shaft into the space between the shaft and the cylinders, and plates for directing air streams over the external surfaces of the cylinders.

17. In a barrel engine, a hollow rotatable main shaft having longitudinally spaced lateral outlets, cylinders grouped around said shaft, each cylinder having ports, means for causing air to flow into said shaft, a chamber surrounding said shaft, said chamber communicating with certain of the shaft outlets and with said cylinder ports, and means for conducting air from other of said shaft outlets over the exterior surfaces of the cylinders.

18. In a barrel engine, a hollow rotatable main shaft having longitudinally spaced lateral outlets, cylinders grouped around said shaft, each cylinder having ports, means for causing air to flow into said shaft, a chamber surrounding said shaft, said chamber communicating with certain of the shaft outlets and with said cylinder ports, means for conducting air from other of said shaft outlets over the exterior surfaces of the cylinders, and flow restricting means in said shaft between the outlets thereof delivering air to said chamber and the outlets delivering air to the exterior surfaces of the cylinders.

19. A barrel engine having a hollow main shaft and cylinders grouped around said shaft, a partition in said shaft intermediate the ends of said cylinders, openings in the wall of the shaft on opposite sides of the partition, means for forcing air into opposite ends of said shaft, and means for directing streams of air from said outlets over the surfaces of said cylinders.

20. A barrel engine having cylinders grouped about a central shaft, said shaft being hollow and having a closure therein intermediate the ends of the cylinders, said shaft having an inlet spaced from said closure and an outlet intermediate the inlet and closure, means for forcing air into said inlet, and means for directing air from said outlet over the surfaces of said cylinders.

HERACLIO ALFARO.